Feb. 6, 1945.　　　　E. L. FRITZBERG　　　　2,368,919
PRECIPITATION OF PROTEINS
Filed June 11, 1942
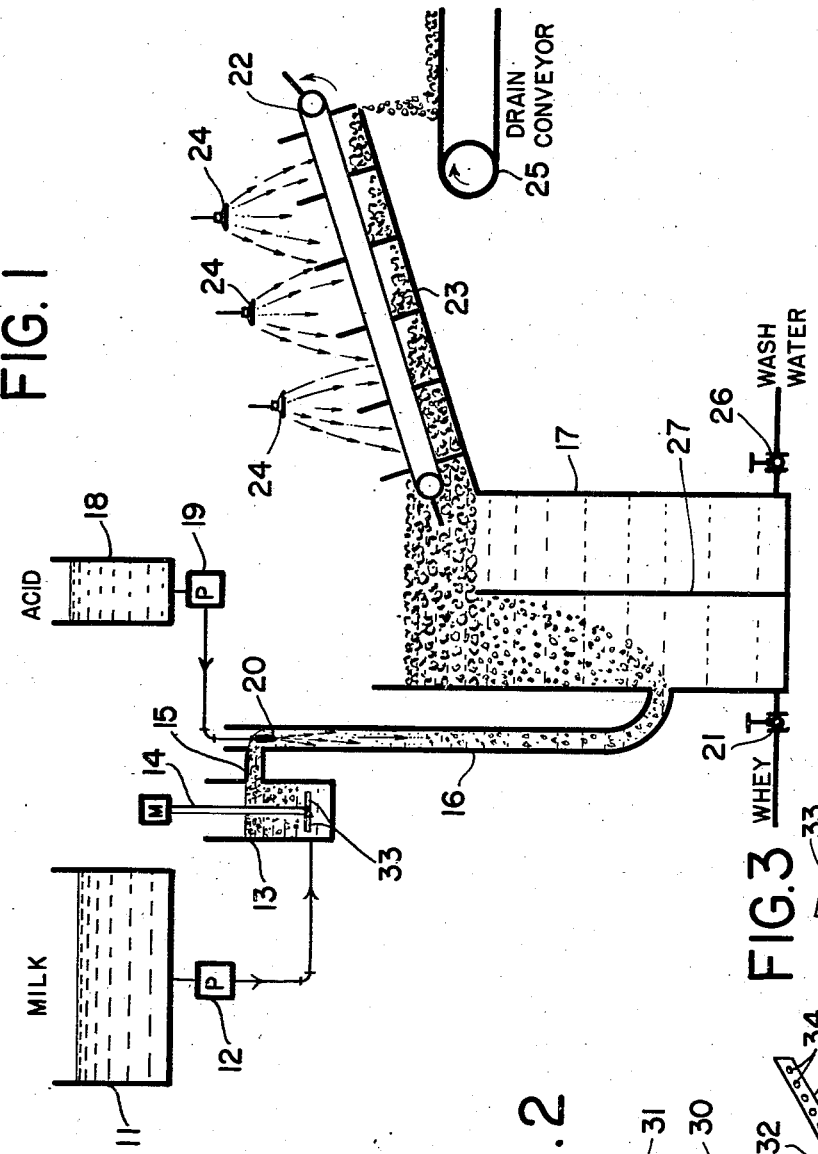
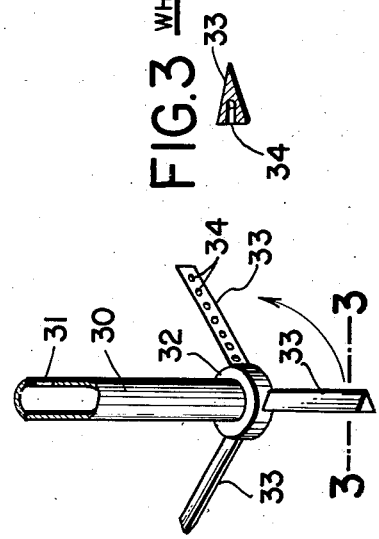
INVENTOR
EDWARD L. FRITZBERG
BY Anthony A. Juettner
ATTY.

Patented Feb. 6, 1945

2,368,919

UNITED STATES PATENT OFFICE 2,368,919

PRECIPITATION OF PROTEINS

Edward L. Fritzberg, Minneapolis, Minn., assignor to General Mills, Inc., a corporation of Delaware Application June 11, 1942, Serial No. 446,679

4 Claims. (Cl. 260—120)

The present invention relates to the precipitation of proteins from colloidal dispersions and more particularly relates to the precipitation of proteins in the form of a curd which is lighter than water and which may be separated from the liquid without resort to the conventional methods of draining and the like.

In the conventional production of proteins by precipitation, for example, precipitation of casein from milk, the body of milk is treated with acid or rennet or other suitable precipitating agent. The curds settle to the bottom of the tank and the whey is removed by decantation. The curds which are left behind must be washed repeatedly to remove residual traces of whey. Draining of the casein to remove residual whey or wash water usually necessitates drain racks at the bottom of the tank. These are difficult to clean. Moreover, this process involves manual handling of the curds and as a result the operation involves conditions which do not meet the sanitary standards set by many of the health authorities. Accordingly, casein produced according to such conventional processes is not considered of sufficient purity to meet health standards for addition to various food products, for example milk, but may be used for industrial purposes such as plastics, paints and the like.

The present invention overcomes many of the objectionable features of the prior art by the precipitation of a curd which is lighter than water and which, accordingly, floats. In this way it is possible to avoid the draining operation with its attendant unsanitary handling and permits the production of casein and other proteins in sanitary equipment without the necessity for manual handling. The present invention permits a continuous operation for the production of an edible protein of the highest quality without manual manipulation.

It is therefore an object of the present invention to provide a process for the precipitation of proteins which eliminates manual handling.

It is a further object of the present invention to provide a process for precipitation of proteins from aqueous dispersions in which the precipitated protein is caused to float on the surface of the water, from which it may be removed and washed without the necessity of draining.

A still further object of the present invention is to provide a process for the precipitation of casein from milk in which the precipitated curds float on the surface of the whey and may be removed from the surface and washed.

It is another object of the invention to provide a continuous process for the precipitation of proteins while avoiding manual handling.

These and other objects of the invention will be apparent from the following description with respect to the drawing in which Figure 1 is a diagrammatic illustration of one embodiment of the invention;

Fig. 2 illustrates one type of stirring device which may be used to incorporate a non-condensable gas into the protein dispersion; and Fig. 3 is a section taken on the line 3—3 of Fig. 2.

While the following example is with specific reference to the precipitation of casein from milk, the invention may be applied to the precipitation of protein from any aqueous dispersion.

Milk from a storage tank 11 may be withdrawn by pump 12 and introduced near the bottom of agitating tank 13. This tank is provided with an agitator 14 which may be of the type illustrated in Figs. 2 and 3. This agitator incorporates air, carbon dioxide, nitrogen or other non-condensable gas into the milk and converts it into a gaseous-liquid dispersion which is then withdrawn from the tank 13 through outlet 15 near the top of the tank, and discharges into vertical pipe 16 which conducts the dispersion into the separation tank 17 at a point intermediate its height. A suitable acid from storage tank 18 may be withdrawn by pump 19 and intimately mixed into the dispersion by mixing device 20. This results in a precipitation of the casein in the form of curds which entrap large quantities of gas. As a result they are lighter than water and will float on the surface of the whey. The long pipe 16 provides a sufficient time period for reaction to take place and at the same time the flow of the milk through the pipe produces sufficient agitation to provide thorough mixing of the acid and milk. Suitable mixing devices such as baffles may be employed in the pipe 16 to increase the turbulence to any desired extent.

This is a decided advantage of the present invention in that it insures uniform and thorough mixture of the reactants and thus produces a curd of uniform properties such as pH, curd size, solubility characteristics, etc. This permits the use of a minimum amount of precipitant and of wash water, and is in distinction to the prior art processes in which inefficient mixing of reactants requires excessive quantities of acid and wash water as well as resulting in a lower yield of a non-uniform product.

The hydraulic head from the liquid level in agitator tank 13 is sufficient to force the lighter than water curds into the separation tank 17 beneath the liquid level therein. The curds tend to rise and thus become separated from the whey which settles to the bottom of the tank and may be withdrawn through pipe 21. When the curds reach the surface they are withdrawn by means of the conveyor 22 which propels the curds up the surface of an incline 23. Water sprays 24 wash the curd as it progresses up the incline and the washed curd is discharged at the end of the incline onto conveyor 25 which may be of a suitable type permitting the draining of excess water. These curds may be washed further or not as desired and then may be dried in any suitable manner to yield a clean, edible casein product. The wash water from the sprays 24 flows into tank 17 and may be removed from the bottom thereof through pipe 26. Baffle 27 keeps the curds and whey separated from the wash water.

Pumps 12 and 19 are preferably proportioning pumps driven from a common source of power. In this way the amount of milk and precipitant can be regulated to the amounts required for satisfactory reaction. Furthermore, the use of this type of pump assures uniformity of the product produced, particularly when the operation is continuous.

The agitator 14 may be of the type illustrated in Fig. 2. It may be composed of a hollow shaft 30 having an opening 31 to the atmosphere or to a suitable source of non-condensable gas. The shaft 30 may terminate in a suitable collar 32 to which are attached a number of arms 33. These arms have a passageway extending along their length communicating with the space inside the hollow shaft 30. A series of holes 34 on the trailing edge of the arms communicate with the longitudinal passage within the arms. This is illustrated in Fig. 3 which is a cross-section of one of the arms taken on line 3—3 of Fig. 2. As the agitator rotates in the direction indicated, a partial vacuum is created at the trailing edge of the arms. This causes a flow of air or other gas to occur through opening 31, the hollow shaft 30, the longitudinal passage through the arms 33 and finally into the liquid through the outlets 34. In this manner minute bubbles of air are introduced into the milk and serve to convert the same into a gaseous-liquid dispersion. The above device is highly satisfactory from a sanitary standpoint. Other simpler devices such as compressed air sprays may be used where sanitary requirements are less exacting.

In the case of milk it is preferred to have the temperature between about 35° C. and about 45° C. Within the above range, dispersion conditions are optimum. As a general rule it is preferred to keep the temperature as near the bottom of the range as is practical. Whole milk requires a higher temperature than skim milk to produce a satisfactory dispersion. Too high temperatures are to be avoided, as they tend to produce a cooked product. While the process may be operated at temperatures outside the above range, that range is preferred as it produces a casein that is free from heat denaturization and can readily be converted to a water-soluble product.

The present invention is not limited to the preparation of edible casein but may likewise be used for the preparation of industrial casein to be used for plastics and paints, as well as the precipitation of proteins from other materials as, for example, the precipitation of soybean protein from an aqueous dispersion. The same advantages accrue in all these operations. Likewise, any other suitable precipitants besides acid may be employed. For example, suitable proteolytic enzymes such as rennet and pepsin may be employed. Since these enzymes usually are slower in reacting, it is ordinarily preferable to provide a longer time period in pipe 16. Furthermore, the type of curd produced by enzymes is different from that produced by acid. The enzyme curd usually tends to clump together slightly and for that reason it is customarily desirable to provide some suitable means for breaking up these clumps on the surface of the whey.

The present invention may be used for the preparation of various types of cheese. The curds after precipitation may be processed in accordance with conventional cheese-making practice.

It is apparent from the above description that by means of the present invention it is possible to produce edible protein material in which the handling of the casein is minimized and which obviates the necessity of any special equipment. Furthermore, the process can be conducted in equipment which will meet the approval of the most rigid health code.

By the term "non-condensable gas" as used herein, it is intended to include gases which do not condense at atmospheric pressure and at temperatures from about room temperature to about the boiling point of water at atmospheric pressure.

While various specific embodiments of the invention have been described, it is to be understood that the invention is not limited thereto but may be varied within the scope of the appended claims.

I claim as my invention:

1. Process of precipitating casein from milk which comprises incorporating a substantially inert non-condensable gas into the milk to produce a gaseous-liquid dispersion, adding an acid precipitant to the gaseous-liquid dispersion to precipitate casein therein, and then separating the precipitated casein from the whey by flotation.

2. Process of precipitating casein from milk which comprises continuously flowing a proportioned stream of milk into a gas incorporating zone, continuously incorporating a substantially inert non-condensable gas into said milk in said zone to convert the same into a gaseous-liquid dispersion, continuously withdrawing a stream of said gaseous-liquid dispersion from said zone, continuously mixing a proportioned stream of acid precipitant with said stream of gaseous-liquid dispersion to precipitate the casein therein, and continuously separating the precipitated casein from the whey by flotation.

3. Process of precipitating casein from milk which comprises flowing a proportioned stream of milk into a gas incorporating zone, incorporating a substantially inert non-condensable gas in said dispersion in said zone to produce a gaseous-liquid dispersion, flowing a proportioned stream of an acid precipitant into said gaseous-liquid dispersion to precipitate protein therein, flowing a stream of the resultant mixture to a separating zone, floating the curds on top of the whey in said zone, and removing the curds from the top of said zone to separate them from the whey.

4. Process of precipitating casein from milk which comprises continuously incorporating air into a proportioned stream of milk to convert the same into a gaseous-liquid dispersion, continuously mixing a proportioned stream of an acid precipitant with a stream of said gaseous-liquid dispersion, mixing the resultant mixture to secure uniform precipitation of the casein, introducing the stream of precipitated material into a separating zone intermediate the height thereof, withdrawing whey from the bottom of said separating zone, permitting the curds to float to the top of said zone, and continuously removing and washing the curds from the top of said zone.

EDWARD L. FRITZBERG.